United States Patent
Ozaki et al.

(10) Patent No.: US 8,977,330 B2
(45) Date of Patent: Mar. 10, 2015

(54) IN-VEHICLE APPARATUS

(75) Inventors: Yukisuke Ozaki, Kobe (JP); Shigehiko Kagotani, Kobe (JP); Teru Sawada, Kobe (JP); Shigehiko Miura, Kobe (JP); Kana Hirai, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 594 days.

(21) Appl. No.: 13/285,667

(22) Filed: Oct. 31, 2011

(65) Prior Publication Data

US 2012/0142273 A1   Jun. 7, 2012

(30) Foreign Application Priority Data

Dec. 6, 2010   (JP) .................................. 2010-272051

(51) Int. Cl.
  *H04M 1/00* (2006.01)
  *H04M 1/60* (2006.01)
  *H04M 1/725* (2006.01)

(52) U.S. Cl.
  CPC ........ *H04M 1/6091* (2013.01); *H04M 1/72544* (2013.01)
  USPC ..................................... 455/575.9; 455/569.2

(58) Field of Classification Search
  CPC ......................... H04M 1/6075; H04M 1/6083
  USPC ........................................ 455/569.2, 575.9
  See application file for complete search history.

(56) References Cited

U.S. PATENT DOCUMENTS

| | | | | |
|---|---|---|---|---|
| 5,612,881 | A * | 3/1997 | Moroto et al. | 701/428 |
| 6,236,918 | B1 * | 5/2001 | Sonoda et al. | 701/36 |
| 6,965,787 | B2 * | 11/2005 | Kindo et al. | 455/569.2 |
| 7,251,507 | B2 * | 7/2007 | Kitao et al. | 455/569.2 |
| 7,519,399 | B2 * | 4/2009 | Suzuki | 455/569.1 |
| 7,702,324 | B2 * | 4/2010 | Suzuki et al. | 455/420 |
| 7,778,595 | B2 * | 8/2010 | White et al. | 455/3.06 |
| 7,912,513 | B2 * | 3/2011 | Tanaka et al. | 455/569.2 |
| 8,090,367 | B2 * | 1/2012 | Kameyama | 455/426.1 |
| 2002/0032048 | A1 * | 3/2002 | Kitao et al. | 455/569 |
| 2003/0069000 | A1 * | 4/2003 | Kindo et al. | 455/345 |
| 2004/0209655 | A1 * | 10/2004 | Kubo | 455/569.1 |
| 2009/0128329 | A1 * | 5/2009 | Sato et al. | 340/568.1 |
| 2011/0185390 | A1 * | 7/2011 | Faenger et al. | 725/75 |
| 2013/0121502 | A1 * | 5/2013 | Fujii et al. | 381/77 |

FOREIGN PATENT DOCUMENTS

| | | |
|---|---|---|
| JP | A-2005-199960 | 7/2005 |
| JP | A-2007-081780 | 3/2007 |
| JP | A-2007-267776 | 10/2007 |
| JP | A-2008-206015 | 9/2008 |

* cited by examiner

*Primary Examiner* — April G Gonzales
(74) *Attorney, Agent, or Firm* — Oliff PLC

(57) ABSTRACT

An in-vehicle apparatus links up with a mobile device that executes an application. A memory of the in-vehicle apparatus stores acoustic data of a sound relevant to the application, and a receiver receives a direction signal transmitted from the mobile device at a timing specified by the application. An output part of the in-vehicle apparatus outputs the sound based on the acoustic data stored in the memory via a speaker in response to the direction signal received by the receiver.

20 Claims, 8 Drawing Sheets

ACOUSTIC DATA TABLE

| ACOUSTIC TYPE | ACOUSTIC NAME | ACOUSTIC FILE |
| --- | --- | --- |
| A: EFFECT SOUND | 10 | A10.mp3 |
| | 11 | A11.mp3 |
| | 12 | A12.mp3 |
| | 13 | A13.mp3 |
| B: BGM | 10 | B10.mp3 |
| | 11 | B11.mp3 |

FIG.3

EFFECT SOUND COMMAND

| MOBILE DEVICE NAME | APPLICATION NAME | REQUEST CODE (00) | ACOUSTIC SPECIFICATION CODE | OUTPUT SPECIFICATION CODE | NUMBER-OF-TIMES SPECIFICATION CODE |
|---|---|---|---|---|---|

BGM START COMMAND

| MOBILE DEVICE NAME | APPLICATION NAME | REQUEST CODE (10) | ACOUSTIC SPECIFICATION CODE | OUTPUT SPECIFICATION CODE |
|---|---|---|---|---|

BGM STOP COMMAND

| MOBILE DEVICE NAME | APPLICATION NAME | REQUEST CODE (11) |
|---|---|---|

IN-VEHICLE APPARATUS

BACKGROUND OF THE INVENTION

1. Field of the Invention

The invention relates to a technology for communication between a mobile device and an in-vehicle apparatus.

2. Description of the Background Art

A car navigation apparatus and a car audio apparatus are conventionally known as in-vehicle apparatuses. The in-vehicle apparatus provides functions mainly to a driver. In an example, a conventional in-vehicle apparatus includes various functions to provide navigation assistance to a driver so that the driver can concentrate on driving without losing his/her way.

No matter how useful to a driver the conventional in-vehicle apparatus is, it is unattractive to a passenger. That is, the vehicle space created by the conventional in-vehicle apparatus during traveling hours is not attractive to a passenger and lacks entertainment.

In a newly-proposed technology, an in-vehicle apparatus links up with another apparatus so that a passenger can enjoy the vehicle space during traveling hours. Concretely in the newly-proposed technology, a communication connection between an in-vehicle apparatus and another apparatus such as a game machine is provided, and sounds are output from in-vehicle speakers based on the acoustic data transmitted from another apparatus.

However, in the conventional technology, the sounds based on the acoustic data transmitted from another apparatus are output from the in-vehicle speakers via the in-vehicle apparatus. Thus, in the case where the communication speed between the in-vehicle apparatus and another apparatus is not enough, a time lag to the output of an actual sound is generated.

In an example of the conventional technology, there is a time lag from a user operation on another apparatus to the output of an actual effect sound. Thus, the conventional technology hardly provides full entertainment.

SUMMARY OF THE INVENTION

According to one aspect of the invention, an in-vehicle apparatus that is used in a vehicle includes a memory that stores acoustic data relevant to an application executed on a mobile device linking up with the in-vehicle apparatus, a receiver that receives a direction signal transmitted from the mobile device at a timing specified by the application, and an output part that outputs a sound based on the acoustic data stored in the memory, via a speaker in response to the direction signal received by the receiver.

Since a time lag attributable to the data communication between the in-vehicle apparatus and the mobile device is shortened, the in-vehicle apparatus can provide greater entertainment.

According to another aspect of the invention, the memory stores a plurality of the acoustic data, the direction signal has specification data for specifying one of the plurality of acoustic data, and the output part outputs the sound based on the acoustic data specified by the specification data.

The in-vehicle apparatus can output the sound based on the acoustic data specified by the mobile device.

According to another aspect of the invention, the direction signal has specification data for specifying a sound image position where a sound image is localized, and the output part outputs the sound based on the acoustic data in accordance with the specification data via a plurality of the speakers to localize the sound image at the sound image position.

The in-vehicle apparatus can localize the sound image at the sound image position specified by the mobile device.

Therefore, the object of the invention is to provide greater entertainment by shortening the time lag at a time of sound output.

These and other objects, features, aspects and advantages of the invention will become more apparent from the following detailed description of the invention when taken in conjunction with the accompanying drawings.

BRIEF DESCRIPTION OF THE DRAWINGS

FIG. 3 shows an example of an acoustic data table.

FIG. 4A describes a format of an effect sound command.

FIG. 4B describes a format of a BGM start command.

FIG. 4C describes a format of a BGM stop command.

DESCRIPTION OF THE EMBODIMENTS

1. Outline of In-Vehicle Apparatus

Figure 1A:
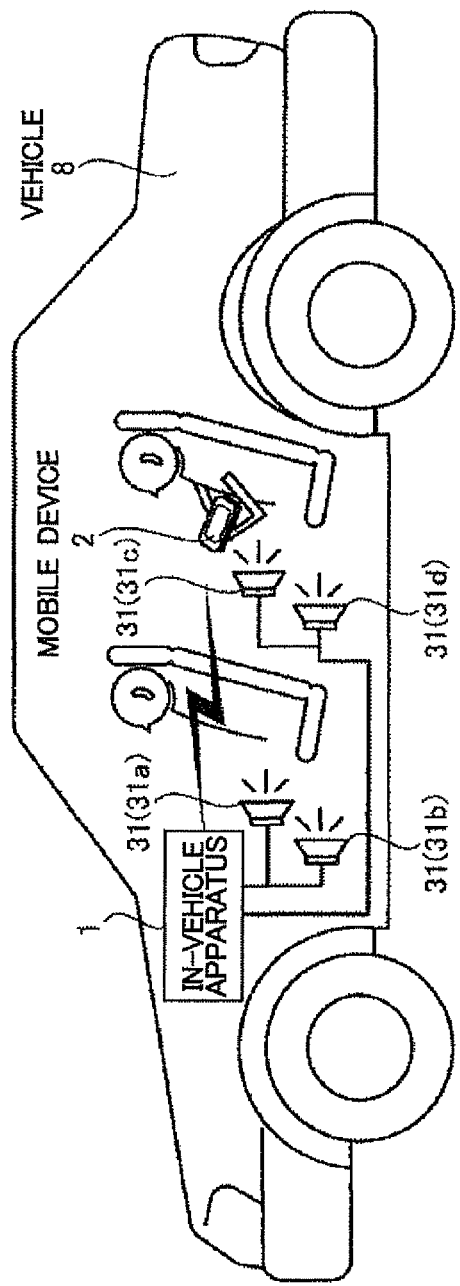
FIG. 1A describes an outline of an in-vehicle apparatus.

One embodiment of the in-vehicle apparatus of the invention will be hereinafter described in detail in reference to attached drawings. First, the outline of the in-vehicle apparatus of the invention will be described using FIG. 1A, prior to the detailed description of the embodiment. FIG. 1A describes the outline of the in-vehicle apparatus of the invention.

As shown in FIG. 1A, a vehicle 8 equipped with an in-vehicle apparatus 1 of the invention includes a plurality of in-vehicle speakers 31. The plurality of in-vehicle speakers 31 include a right front speaker 31a, a left front speaker 31b, a right rear speaker 31c, and a left rear speaker 31d.

The in-vehicle apparatus 1 of the invention provides wireless communication with a mobile device 2 and can link up with the mobile device 2. The in-vehicle apparatus 1 outputs sounds in response to a direction from the mobile device 2 via the plurality of in-vehicle speakers 31.

A plurality of acoustic data of the sounds relevant to the operations of the mobile device 2 are previously stored in the in-vehicle apparatus 1. The in-vehicle apparatus 1 outputs via the plurality of in-vehicle speakers 31 the sounds based on the acoustic data specified by the direction from the mobile device 2.

As above, the in-vehicle apparatus 1 of the invention outputs the sounds relevant to the operations of the mobile device 2 via the in-vehicle speakers 31 without the acoustic data transmitted from the mobile device 2. This drastically reduces the volume of the data transmitted from the mobile device 2 compared to the case where the acoustic data is transmitted from the mobile device 2, and shortens a time lag attributable to the data communication. Besides, in the case where the in-vehicle apparatus 1 is connectable to a plurality of the mobile devices 2, occupation of communication band by specific one of the mobile devices 2 can be prevented. In addition, consumption of the battery capacity of the mobile device 2 can be saved.

As above, since the in-vehicle apparatus 1 timely outputs the sounds relevant to the operations of the mobile device 2 from the plurality of in-vehicle speakers 31, the in-vehicle apparatus 1 can provide the vehicle space with greater entertainment such that a passenger inside the vehicle 8 can enjoy the vehicle space as an attractive space during traveling hours.

Figure 1B:
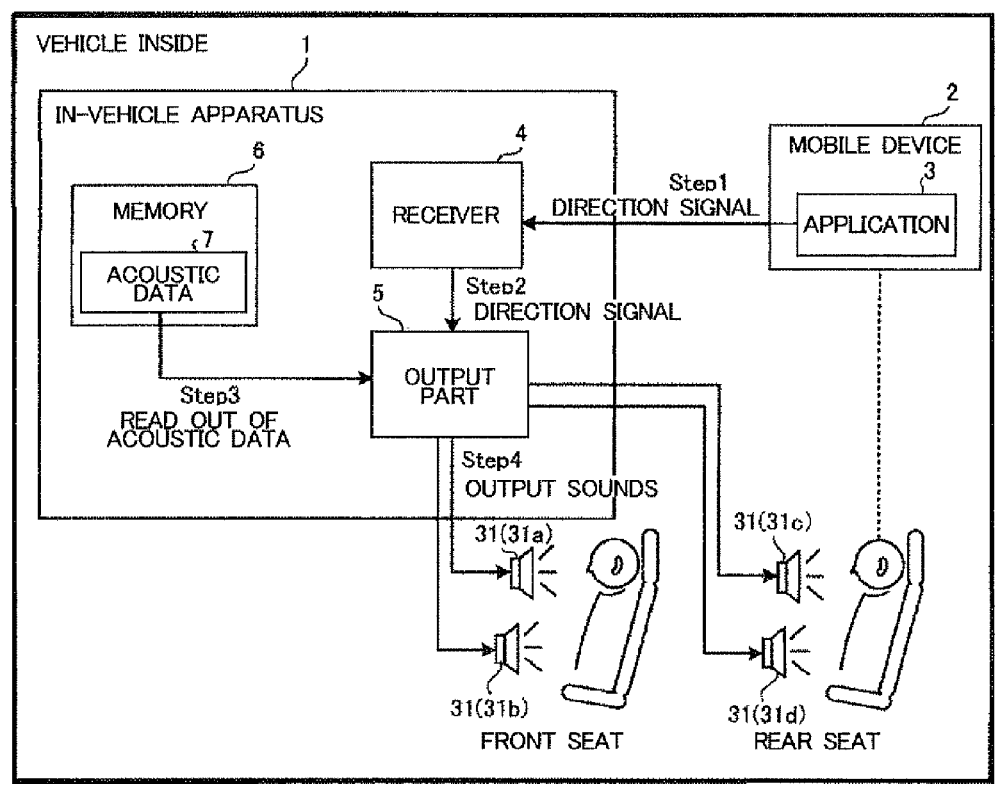
FIG. 1B also describes the outline of the in-vehicle apparatus.

The flow of the linkage between the in-vehicle apparatus 1 and the mobile device 2 will be described in reference to FIG. 1B. First, an application 3 is executed on the mobile device 2. Then, the mobile device 2 transmits a direction signal by processing of the application 3 (Step 1). The direction signal is transmitted from the mobile device 2 to the in-vehicle apparatus 1 via wireless communication. The direction signal may be transmitted by a communication method using cables.

The direction signal is transmitted from the mobile device 2 at a timing specified by the application 3 executed on the mobile device 2. In other words, the direction signal is transmitted at the timing corresponding to the occurrence of the operation during execution of the application 3 on the mobile device 2. The application 3 specifies a right timing for sound generation, such as the timing when a specified event is happened during execution of the application 3, or when a user operates the mobile device 2 during execution of the application 3. At the right timing as above, the direction signal is transmitted from the mobile device 2.

The direction signal transmitted from the mobile device 2 is received by a receiver 4 of the in-vehicle apparatus 1. Then, the direction signal received by the receiver 4 is transmitted from the receiver 4 to an output part 5 (Step 2).

The in-vehicle apparatus 1 includes a memory 6. The memory 6 stores a plurality of acoustic data 7 relevant to the application 3 of the mobile device 2. The output part 5 reads out one of the acoustic data 7 stored in the memory 6 based on the direction signal received by the receiver 4 (Step 3).

The plurality of acoustic data 7 stored in the memory 6 include various acoustic data such as background music (BGM) data of BGM and effect sound data of effect sounds. The direction signal includes acoustic specification data that specifies one of the acoustic data. The output part 5 reads out from the memory 6 the one of the acoustic data specified by the acoustic specification data included in the direction signal. In an example, when the acoustic specification data specifies one of the effect sound data, the output part 5 reads out from the memory 6 the effect sound data specified by the acoustic specification data.

Then, the output part 5 outputs the sounds from the in-vehicle speakers 31 based on the acoustic data read out from the memory 6 (Step 4). The direction signal includes output specification data that specifies a sound volume, a position where a sound image is localized (hereinafter referred to as "sound image position"), etc. The output part 5 outputs the sounds based on the acoustic data from the plurality of in-vehicle speakers 31 in accordance with the output specification data. The output part 5 determines, in accordance with the output specification data, a sound volume and a sound phase for outputting the sounds for each speaker of the plurality of in-vehicle speakers 31. Then, the output part 5 outputs the sounds in the determined volume level and the sound phase respectively from the plurality of in-vehicle speakers 31.

Thus, the output part 5 can localize the sound image at the sound image position while adjusting the sound volume. As a result, a passenger in the vehicle 8 perceives the sounds as if it comes from a specific position (sound image position) in the vehicle space. There is an available well-known method to localize a sound image at a certain position. By the method, a sound volume and a sound phase for outputting the sounds are adjusted for each of the plurality of in-vehicle speakers 31.

As above, the in-vehicle apparatus 1 of the invention stores the acoustic data of the sounds relevant to the application 3 executed on the mobile device 2, and outputs from the in-vehicle speakers 31 the sounds relevant to the application 3 in response to the direction signal transmitted from the mobile device 2. Thus, the in-vehicle apparatus 1 can output the sounds relevant to the application 3 without a long delay from the timing specified by the application 3. As a result, the in-vehicle apparatus 1 can provide the vehicle space with greater entertainment such that a passenger who operates the mobile device 2 can enjoy the vehicle space as an attractive space during traveling hours.

The application 3 of the mobile device 2, while in a communication state with the in-vehicle apparatus 1, terminates sound output from the speakers of the mobile device 2, and transmits a direction signal to output sounds only from the in-vehicle speakers 31. The same sounds are not output from both of the speakers of the mobile device 2 and the in-vehicle speakers 31. This provides a user with no sense of discomfort.

The sound output from the in-vehicle apparatus 1 may differ from the sound output from the mobile device 2, by the method in which a part of the plurality of acoustic data relevant to the application 3 are stored in the in-vehicle apparatus 1 and the rest are stored in the mobile device 2 (in the internal memory of the mobile device 2, or in the external memory connected to the mobile device 2).

In an example, the first acoustic data of the sounds (e.g., BGM) for being output to the whole vehicle space is stored in the in-vehicle apparatus 1, and the second acoustic data of the sounds (e.g., effect sounds, secret sounds for adding entertainment to the contents of the application 3) for being heard only by at least the passenger who operates the mobile device 2 is stored in the mobile device 2. The sounds are output respectively from the in-vehicle speakers 31 and the speakers of the mobile device 2 while in a communication state between the in-vehicle apparatus 1 and the mobile device 2. Concretely, the sounds based on the first acoustic data are output from the in-vehicle speakers 31 and the sounds based on the second acoustic data are output from an output part of the mobile device 2. In this case, the mobile device 2 transmits only the direction signal in terms of the first acoustic data to the in-vehicle apparatus 1.

Since the sound image position and the sound volume can be controlled in the in-vehicle apparatus 1, the in-vehicle apparatus 1 of the invention can provide greater entertainment. The sound image position can be set at the same position for all the passengers including a driver, and also, various sound image positions can be set at respective positions depending on the seat positions of the passengers. The respective passengers can perceive the sounds as if the sounds come from different directions. This provides much greater entertainment. Moreover, in an example, moving the sound image position forward, backward, left or right, or rotating the sound image position inside the vehicle space provides further greater entertainment.

The application 3 includes, for example, various game applications of quizzes, treasure hunting, etc. that a driver as well as a passenger can enjoy. Besides, in addition to the game applications, applications linking up with functions of the in-vehicle apparatus 1 may be adopted as the application 3.

In the case where the in-vehicle apparatus 1 is a car navigation apparatus, tourist guiding application using the data of a map and a vehicle position may be adopted as the application 3. An application that provides quizzes according to a vehicle position and a vehicle velocity may also be adopted as the application 3. In these cases, the acoustic data of the sounds such as tourist guiding voices or voices providing quizzes is stored in advance in the memory 6.

In the case where the mobile device 2 includes various executable applications, the memory 6 stores the acoustic data of the sounds according to the various applications, which enables the in-vehicle apparatus 1 to output the sounds according to the various applications.

2. Embodiment

Next, one embodiment of an in-vehicle apparatus of the invention will be described. Hereafter, the embodiment will be described on the assumption that the in-vehicle apparatus is a car navigation apparatus. However, the in-vehicle apparatus is not limited to the car navigation apparatus, and other in-vehicle apparatuses such as a car audio apparatus may be used.

Figure 2:
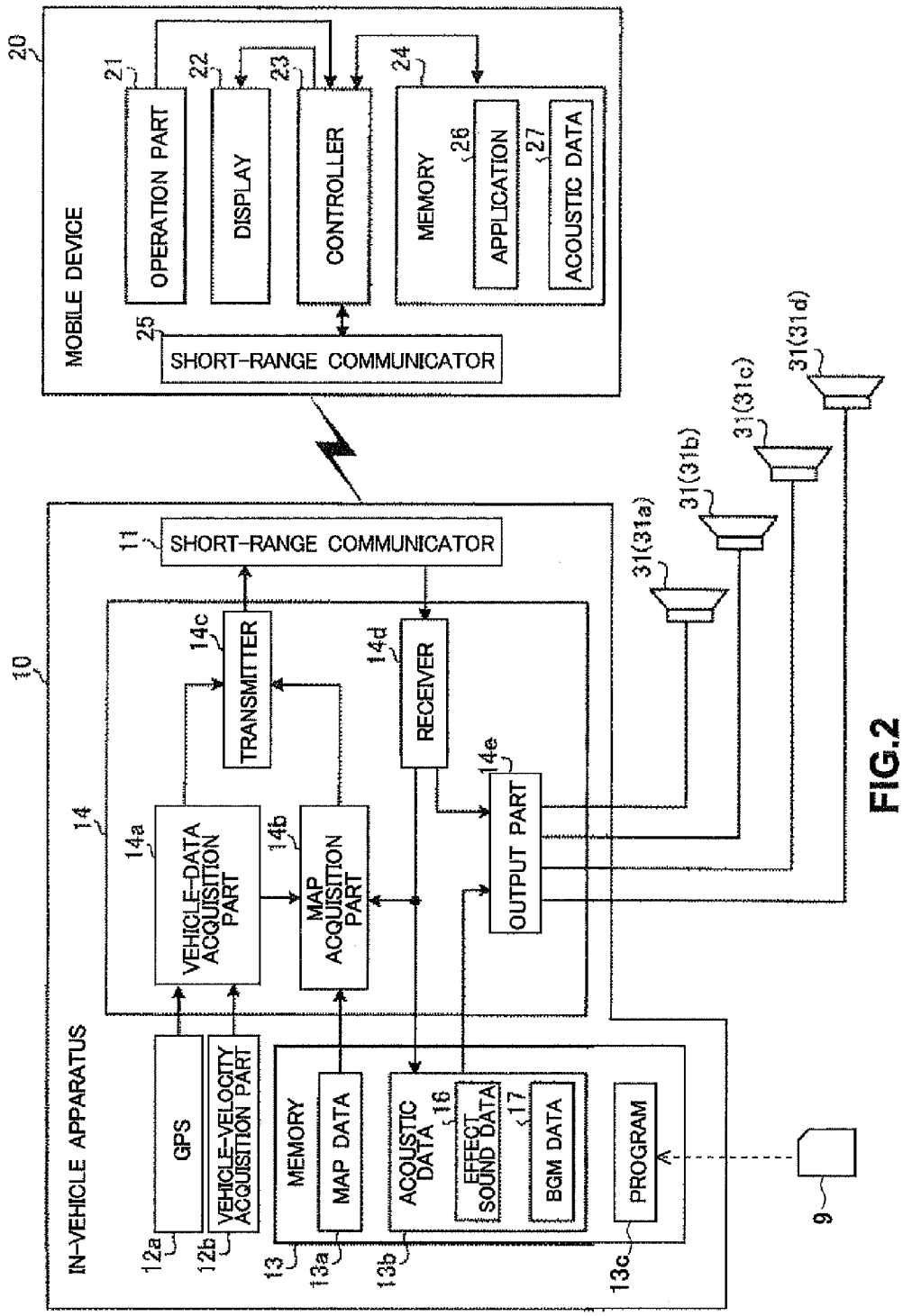
FIG. 2 shows a structure of the in-vehicle apparatus of the invention.

A structure of an in-vehicle apparatus of the embodiment will be described based on FIG. 2. FIG. 2 shows a structure of the in-vehicle apparatus of the embodiment. FIG. 2 mainly shows structural elements necessary for description of the characteristics of an in-vehicle apparatus 10, and does not show other normal structural elements. As an example of the application to be executed on a mobile device 20, an application of a treasure hunting game will be described.

As shown in FIG. 2, the in-vehicle apparatus 10 includes a short-range communicator 11, a GPS 12a, a vehicle-velocity acquisition part 12b, a memory 13 and a controller 14.

The short-range communicator 11 transmits and receives data via short-range wireless communication with the mobile device 20 by using of Bluetooth (registered trademark). The mobile device 20 also includes a short-range wireless communication function using Bluetooth (registered trademark). The mobile device 20 is a portable device such as a mobile phone, a personal handy-phone system (PHS), a personal digital assistant (PDA) or a game machine.

The mobile device 20 includes an operation part 21, a display 22, a controller 23, a memory 24, and a short-range communicator 25. The controller 23 reads out and executes a program of an application 26 stored in the memory 24 in response to the operation on the operation part 21 by a user of the mobile device 20, which allows data communication between the in-vehicle apparatus 10 and the mobile device 20.

In an example, the controller 23 reads out and executes a program of the application 26, which allows a direction signal to be output to the in-vehicle apparatus 10 via the short-range communicator 25, and allows the sounds corresponding to the direction signal to be output from the in-vehicle speakers 31.

The embodiment describes the case of data communication using Bluetooth (registered trademark) between the in-vehicle apparatus 10 and the mobile device 20. However, other wireless communication standards such as Wi-Fi (registered trademark), ZigBee (registered trademark) may be used. The data communication between the in-vehicle apparatus 10 and the mobile device 20 may be implemented by a communication method using cables.

The GPS 12a of the in-vehicle apparatus 10 has a GPS antenna and a GPS receiver. The GPS antenna receives a GPS signal from a satellite, and transmits the GPS signal to the GPS receiver. The GPS receiver demodulates the GPS signal transmitted from the GPS antenna to generate GPS data, and outputs the GPS data to the controller 14.

The vehicle-velocity acquisition part 12b keeps acquiring vehicle-velocity data based on the signals transmitted from a vehicle-velocity sensor included in a vehicle. The vehicle-velocity data indicating the vehicle velocity acquired by the vehicle-velocity acquisition part 12b is output to the controller 14.

The memory 13 stores map data 13a, acoustic data 13b, and a program 13c. The map data 13a includes, for example, road data, facility data, and images of icons. The acoustic data 13b includes effect sound data 16 of effect sounds, and BGM data 17 of BGM. The acoustic data 13b may include other than the effect sound data 16 and the BGM data 17.

The acoustic data 13b will be described concretely in reference to FIG. 3. FIG. 3 shows an example of an acoustic data table T indicating the acoustic data 13b stored in the memory 13. The acoustic data table T of FIG. 3 indicates six acoustic files; four files categorized in effect sounds of "acoustic type," and two files categorized in BGM of the "acoustic type." Each of the four acoustic files categorized in the effect sounds of the "acoustic type" is the effect sound data 16, and each of the two acoustic files categorized in BGM of the "acoustic type" is the BGM data 17.

The controller 14 reads out from the memory 13 the acoustic files specified by the mobile device 20 based on the acoustic data table T. In the case where acoustic specification data included in the direction signal from the mobile device 20 is "A 10," the controller 14 reads out an acoustic file named "A10.mp3" of the effect sound data 16 from the memory 13.

In the case where the acoustic specification data included in the direction signal from the mobile device 20 is "B 10," the controller 14 reads out the acoustic file named "B10.mp3" of the BGM data 17 from the memory 13. The controller 14 may read out the specific acoustic data 13b from the memory 13 by direct specification of the file name in the acoustic specification data without the use of the acoustic data table T.

The acoustic data 13b stored in the memory 13 is obtained by the in-vehicle apparatus 10 from the mobile device 20. The memory 24 of the mobile device 20 stores acoustic data 27 relevant to the application 26. The controller 23 of the mobile device 20 reads out the acoustic data 27 from the memory 24 in the case of executing the application 26.

Then, the controller 23 of the mobile device 20 transmits the acoustic data 27 to the in-vehicle apparatus 10 via the short-range communicator 25. The in-vehicle apparatus 10 obtains the acoustic data 27 transmitted from the mobile device 20 via the short-range communicator 11, and stores the obtained acoustic data 27 in the memory 13 as the acoustic data 13b.

Another method may be used for obtaining the acoustic data 13b, not from the mobile device 20. In an example, the in-vehicle apparatus 10 may obtain the acoustic data 13b by reading out from a non-transitory computer-readable recording medium such as a memory card storing acoustic data, via a reader not indicated in figures. The in-vehicle apparatus 10 may also obtain the acoustic data 13b by downloading over a network server or the like via a network communicator not indicated in the figures.

Next, the controller 14 will be described concretely. The controller 14, as shown in FIG. 2, has a vehicle-data acquisition part 14a, a map acquisition part 14b, a transmitter 14c, a receiver 14d, and an output part 14e.

FIG. 2 shows a functional structure of the controller 14. The controller 14 is physically equipped with a computer having a central processing unit (CPU), a read only memory (ROM), and a random access memory (RAM). The CPU reads out the program 13c from the memory 13 (or the ROM) and executes it using the RAM as a work area. This enables the functions of the vehicle-data acquisition part 14a, the map acquisition part 14b, the transmitter 14c, the receiver 14d, and the output part 14e. The in-vehicle apparatus 10 reads out via a reader not indicated in FIG. 2 the program 13c from a non-transitory computer-readable recording medium 9 (such as a memory card) that stores programs, to obtain the program 13c. The in-vehicle apparatus 10 may download the program 13c from a network server or the like via a network communicator not indicated in FIG. 2 to obtain the program 13c.

The vehicle-data acquisition part 14a obtains position data (longitude data and latitude data, to be concrete) indicating the position of the in-vehicle apparatus 10 based on the GPS data output from the GPS 12a. The position data indicates the position of a vehicle. The vehicle-data acquisition part 14a also obtains direction data indicating the driving direction of the vehicle based on the position data continuously obtained. Moreover, the vehicle-data acquisition part 14a obtains vehicle-velocity data indicating the velocity of the vehicle from the vehicle-velocity acquisition part 12b. The map acquisition part 14b obtains a map image from the memory 13.

The transmitter 14c transmits to the mobile device 20 via the short-range communicator 11 the various data such as the position data the direction data and the vehicle-velocity data obtained by the vehicle-data acquisition part 14a, and a map image obtained by the map acquisition part 14b.

The application 26 of the mobile device 20 proceeds the treasure hunting game based on the data transmitted from the in-vehicle apparatus 10 as above. In this treasure hunting game, a user moves a character shown in the display 22 to a certain position to find a treasure by operating the operation part 21.

The output part 14e outputs via the in-vehicle speakers 31 the sounds based on the acoustic data 13b stored in the memory 13 in accordance with the direction signal received at the receiver 14d. The direction signal is transmitted from the mobile device 20 when a predetermined event occurs during execution of the application 26, or when the mobile device 20 during execution of the application 26 receives a predetermined operation.

The direction signal includes a control command. Hereafter, the control command will be described concretely in reference to FIG. 4A, FIG. 4B, and FIG. 4C. FIG. 4A describes a format of an effect sound command C1, FIG. 4B describes a format of a BGM start command C2, and FIG. 4C describes a format of a BGM stop command C3.

First, the effect sound command C1 in FIG. 4A will be described. The effect sound command C1 is included in the direction signal output from the mobile device 20 at the time of the occurrence of an event for effect sound output during execution of the application 26.

As shown in FIG. 4A, the effect sound command C1 includes "mobile device name," "application name," "request code," "acoustic specification code," "output specification code" and "number-of-times specification code."

The "mobile device name" is the data required for identifying the mobile device 20 for linking up. The "application name" is the data required for identifying the application 26 to be executed on the mobile device 20. The output part 14e of the in-vehicle apparatus 10, based on these data, identifies the mobile device 20 and the application 26 for receiving a direction signal from them.

The output part 14e of the in-vehicle apparatus 10, after starting communication with one of the applications 26 in the mobile device 20, may terminate the reception of the direction signal from other applications or mobile devices until the output part 14e terminates the communication with the application 26.

The output part 14e can also receive direction signals from plural applications or mobile devices based on the request from the application 26. This enables sound output linking up with plural applications or mobile devices, which provides greater entertainment.

The "request code" is required for distinguishing a control command from others. In the case where the control command is the effect sound command C1, the "request code" is "00." That is, when "00" is indicated in the "request code" of the control command, the output part 14e recognizes that the direction signal directs effect sound output.

The "acoustic specification code" is acoustic specification data specifying one of the acoustic data. In the case of the effect sound command C1, the "acoustic specification code" specifies one of the effect sound data 16. In an example, when the acoustic data table T included in the acoustic data 13b is identical with FIG. 3 and the "acoustic specification code" is "A11," the output part 14e reads out an acoustic file named "A11.mp3" among a plurality of the effect sound data 16.

The "output specification code" is output specification data specifying conditions relevant to sound output such as a sound image position and a sound volume. The "output specification code" includes data specifying a sound volume, a sound image position, a moving direction of the sound image position, etc. The output part 14e outputs sounds based on the "output specification code" via the plurality of in-vehicle speakers 31. Thus, the output part 14e adjusts a sound volume to the specified sound volume and localizes a sound image at the specified sound image position.

The "number-of-times specification code" specifies a number of times for sound output. The output part 14e outputs sounds via in-vehicle speakers 31 based on the effect sound data 16 specified by the "acoustic specification code" by repeating the sounds the number of times specified by the "number-of-times specification code."

Next, the BGM start command C2 in FIG. 4B will be described. The BGM start command C2 is included in the direction signal output from the mobile device 20 for start of BGM output.

The BGM start command C2, as shown in FIG. 4B, includes "mobile device name," "application name," "request code," "acoustic specification code," and "output specification code," as well as the effect sound command C1.

In the case where the control command is the BGM start command C2, the "request code" is "10." That is, when "10" is indicated in the "request code" of the control command, the output part 14e recognizes that the direction signal directs the start of BGM output.

The BGM start command C2 includes no "number-of-times specification code" like in the effect sound command C1. This is because, once the output part 14e starts output of the BGM based on the BGM start command C2, the output part 14e repeats the output of the same BUM until the output part 14e receives the direction signal including the BGM stop command C3.

Next, the BGM stop command C3 in FIG. 4C will be described. The BGM stop command C3 is included in the direction signal output from the mobile device 20 for suspension of BGM output.

The BGM stop command C3, as shown in FIG. 4C, includes "mobile device name," "application name," and "request code," as well as the effect sound command C1 and the BGM start command C2.

In the case where the control command is the BGM stop command C3, the "request code" is "11." That is, when "11" is indicated in the "request code" of the control command, the output part 14e recognizes that the direction signal directs the suspension of BGM output.

As above, the in-vehicle apparatus 10 includes the function to output sounds from the in-vehicle speakers 31 based on the direction signal output from the mobile device 20 during execution of the application 26. Hereafter, the contents of the application 26 (the contents of a treasure hunting game) executed on the mobile device 20 will be described.

The controller 23 of the mobile device 20, after starting up the application 26, reads out the acoustic data 27 from the memory 24 and transmits the acoustic data 27 via the short-range communicator 25 to the in-vehicle apparatus 10 prior to start of the treasure hunting game.

The controller 14 of the in-vehicle apparatus 10, after reception of the acoustic data 27 from the mobile device 20, stores the acoustic data 27 in the memory 13 as the acoustic data 13b. As above, just after the execution of the application 26, the acoustic data is copied from the mobile device 20 to the in-vehicle apparatus 10.

Figure 5A:
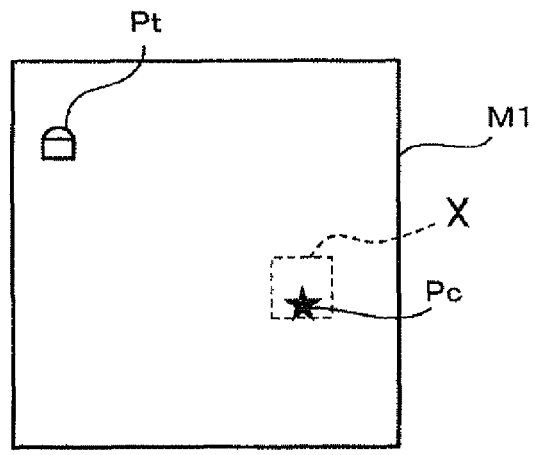
FIG. 5A describes a game.
Figure 5B:
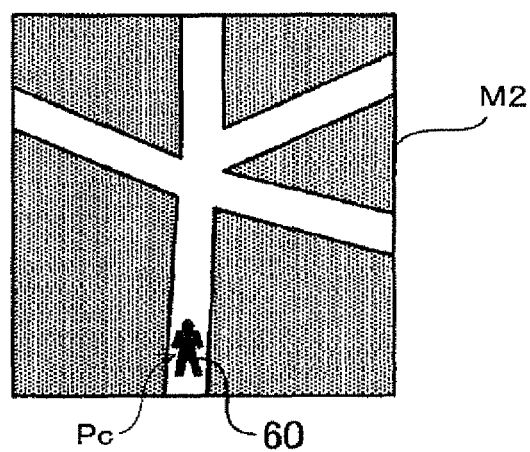
FIG. 5B also describes the game.

After the acoustic data is copied to the in-vehicle apparatus 10, the treasure hunting game is started. FIG. 5A and FIG. 5B describe the contents of the treasure hunting game executed on the mobile device 20.

The controller 23 of the mobile device 20 transmits the direction signal including the BGM start command C2 to the in-vehicle apparatus 10 at the timing of the treasure hunting game started.

After the receiver 14d receives the direction signal from the mobile device 20, the receiver 14d transmits a control command (that is, the BGM start command C2) included in a direction signal to the output part 14e. The output part 14e reads out from the memory 13 the BGM data 17 according to the "acoustic specification code" of the BGM start command C2. Then, the output part 14e outputs the BGM of the BGM data 17 via the plurality of in-vehicle speakers 31 based on the sound volume and the sound image position specified by the "output specification code" of the BGM start command C2.

Next, the mobile device 20 determines the position of a treasure. Concretely, at the beginning, the vehicle-data acquisition part 14a of the in-vehicle apparatus 10 obtains the position data indicating the position of a vehicle and direction data indicating the driving direction of the vehicle. Next, the transmitter 14c transmits the dynamic data of the vehicle including the position data and the direction data to the mobile device 20. The mobile device 20 determines a certain position as a treasure position Pt at random or based on a predetermined rule, as shown in FIG. 5A. The certain position is in a predetermined range from a current position Pc specified by the position data (vehicle position at the time) on a whole map M1 for use at the treasure hunting game.

The controller 23 of the mobile device 20 stores the current position Pc, the treasure position Pt and a relative position on the whole map M1 based on the determined treasure position Pt and the dynamic data (position data and direction data) obtained from the in-vehicle apparatus 10.

The in-vehicle apparatus 10 creates a display map M2 (for example, a deformed brief map or an illustrated map) for display on the mobile device 20. Concretely, the map acquisition part 14b obtains from the map data 13a of the memory 13 the map image of an area located in a relatively-narrow range (an area X shown in FIG. 5A) from the current position Pc, after identifying the current position Pc based on the position data.

Then, the map acquisition part 14b creates based on the obtained map image the display map M2 that is indicated at a larger scale than the whole map M1. The transmitter 14c transmits the created display map M2 to the mobile device 20. The size of the larger-scale map (that is, the display map M2) is larger than the display size of the display 22 of the mobile device 20.

The controller 23 of the mobile device 20 obtains the display map M2 and the dynamic data (position data and direction data) from the in-vehicle apparatus 10, and stores them in the memory 24. The controller 23 partially cuts out an area in the range suitable for the size of the display 22 from the obtained display map M2. Then, the controller 23 displays an image of a character 60 overlapping with the display map M2 at the current position Pc based on the position data on the display 22, as shown in FIG. 5B. Then, the controller 23 receives an operation input from the operation part 21.

The character 60 moves in response to a user operation on the operation part 21 of the mobile device 20. That is, the controller 23 moves the current position Pc to the direction specified by the user operation, and displays the display map M2 overlapped by the image of the character 60 so that the character 60 is displayed at the current position Pc. In this case, the character 60 moves to the direction specified by the user via the operation part 21. Thus, the traveling direction of the character 60 is equivalent to the direction specified by the user.

The character 60 may move in response to the position of the vehicle. In this case, the dynamic data of the vehicle (position data and direction data) is periodically transmitted from the in-vehicle apparatus 10 to the mobile device 20. The controller 23 displays the display map M2 overlapped by the image of the character 60 so that the character 60 is displayed at the current position Pc specified by the position data. In this case, the character 60 moves in response to the current position of the vehicle at the time. Thus, the traveling direction of the character 60 is equivalent to the traveling direction of the vehicle.

The controller 23 changes the area targeted for cutout from the display map M2 obtained from the in-vehicle apparatus 10 in response to the position change of the character 60. Thus, the display map M2 scrolled in response to the position of the character 60 is displayed on the display 22 of the mobile device 20. As a result, the position of the character 60 is kept at a predetermined position (for example, at a center lower part) on the screen of the display 22.

The controller 23 of the mobile device 20 requests to the in-vehicle apparatus 10 the updated display map M2 on the traveling direction of the character 60 when the area displayed on the display 22 moves close to the end portion of the display map M2 obtained from the in-vehicle apparatus 10 in response to the position move of the character 60. Concretely, the controller 23 transmits a map request signal to the in-vehicle apparatus 10. The map request signal is received by the receiver 14d of the in-vehicle apparatus 10, and then transmitted to the map acquisition part 14b.

The map acquisition part 14b obtains from the memory 13 the map image according to the position of each request from the mobile device 20, creates the display map M2, and outputs the display map M2 to the mobile device 20 via the transmitter 14c.

In the embodiment, as above, the in-vehicle apparatus 10 creates the display map M2 based on the map image, and transmits the display map M2 and the position data to the mobile device 20. However, the in-vehicle apparatus 10 may create a display image in which the image of the character 60 overlaps with the display map M2 at the current position Pc, and may transmit the display image to the mobile device 20.

The controller 23 of the mobile device 20 creates the effect sound command C1 according to each operation on the operation part 21. Further, the controller 23 creates the effect sound command C1 based on the relation between the treasure position Pt stored in the memory 24 and the current position Pc of the character 60.

The controller 23 transmits the direction signal including the created effect sound command C1 to the in-vehicle apparatus 10 via the short-range communicator 25. The receiver 14d receives the direction signal and transmits the control command (that is, the effect sound command C1) included in the direction signal to the output part 14e. The output part 14e reads out the effect sound data 16 specified by the "acoustic specification code" of the effect sound command C1. Then, the output part 14e outputs the effect sound of the effect sound data 16 via the plurality of in-vehicle speakers 31 based on the sound volume and the sound image position specified by the "output specification code" of the effect sound command C1.

Next, in reference to FIG. 6A, FIG. 6B, FIG. 6C and FIG. 6D, the sound volume and the sound image position of the effect sound will be described. On FIGS. 6A to 6D, the sound volume of the effect sound is shown by the size of the rectangular area set at a sound image position Ps. The traveling direction of the character 60 is shown by an arrow AR.

Figure 6A:
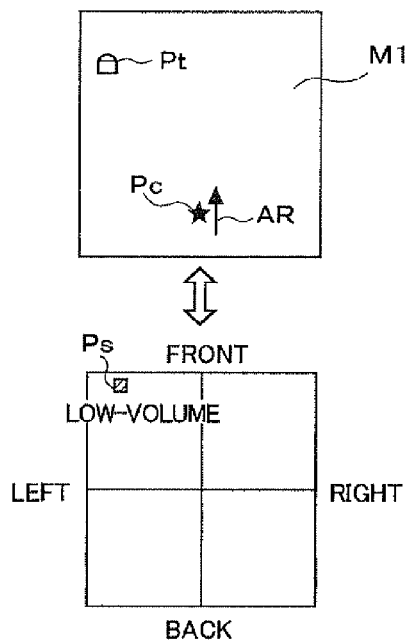
FIG. 6A shows a relation of the positions between a character and a sound image.

Here is an assumption that the current position Pc of the character 60 and the treasure position Pt on the whole map M1 are in the relation shown in the upper figure of FIG. 6A. In this case, since the distance between the current position Pc of the character 60 and the treasure position Pt is relatively long, the effect sound is output at a relatively-low volume from the in-vehicle speakers 31. The treasure position Pt seen from the current position Pc of the character 60 is on the left side based on the traveling direction AR. Thus, as shown in the lower figure of FIG. 6A, the sound image position Ps is set on the left forward based on the vehicle.

Figure 6B:
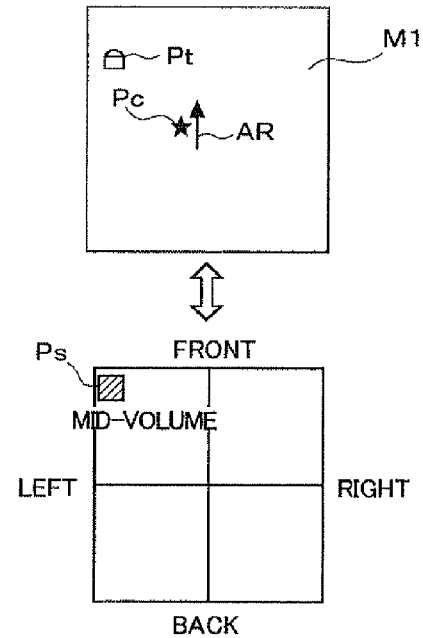
FIG. 6B also shows the relation of the positions between the character and the sound image.

Here is another assumption that the current position Pc of the character 60 and the treasure position Pt on the whole map M1 are in the relation shown in the upper figure of FIG. 6B. This is the case where the distance between the current position Pc of the character 60 and the treasure position Pt is relatively short (shorter than the firstly-prescribed distance). In this case, the effect sound is output at a middle volume from the in-vehicle speakers 31, as shown in the lower figure of FIG. 6B. The treasure position Pt seen from the current position Pc of the character 60 is also on the left side based on the traveling direction AR. Thus, as shown in the lower figure of FIG. 6B, the sound image position Ps is set on the left forward based on the vehicle.

Figure 6C:
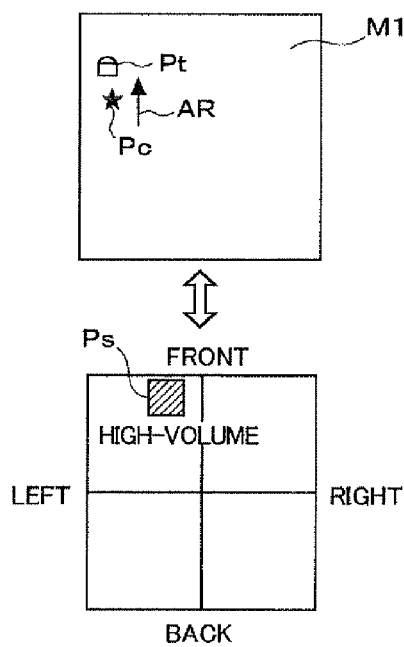
FIG. 6C also shows the relation of the positions between the character and the sound image.

Here is another assumption that the current position Pc of the character 60 and the treasure position Pt on the whole map M1 are in the relation shown in the upper figure of FIG. 6C. This is the case where the distance between the current position Pc of the character 60 and the treasure position Pt is much shorter than the case of the upper figure of FIG. 6B (shorter than the secondly-prescribed distance being shorter than the firstly-prescribed distance). In this case, the effect sound is output at a large volume from the in-vehicle speakers 31, as shown in the lower figure of FIG. 6C. The treasure position Pt seen from the current position Pc of the character 60 is slightly on the left side based on the traveling direction AR. Thus, as shown in the lower figure of FIG. 6C, the sound image position Ps is set on the forward slightly to the left based on the vehicle.

Figure 6D:
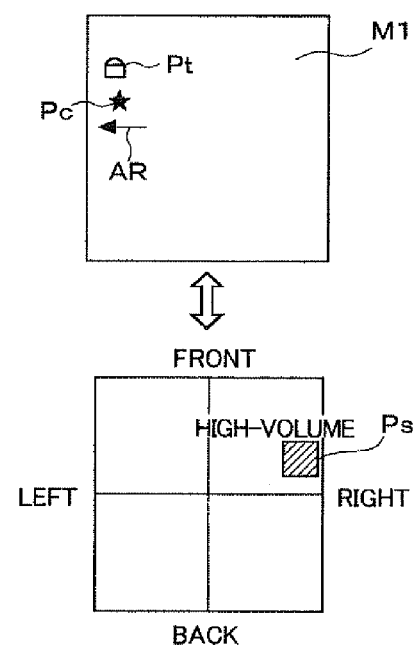
FIG. 6D also shows the relation of the positions between the character and the sound image.

Here is another assumption that the current position Pc of the character 60 and the treasure position Pt on the whole map M1 are in the relation shown in the upper figure of FIG. 6D. This is the case where the current position Pc of the character 60 and the treasure position Pt are in the same relation as the case of the upper figure of FIG. 6C, while the traveling direction AR of the character 60 differs in the angle by 90 degree. Thus, the sound image position Ps also differs in the angle by 90 degree. That is, in the case of the upper figure of FIG. 6D, the treasure position Pt seen from the current position Pc of the character 60 is on the right side based on the traveling direction AR. Thus, the sound image position Ps is set on the right slightly to the forward based on the vehicle. As above, the sound image position Ps is determined in accordance with the traveling direction AR of the character 60 as well as the relation between the current position Pc of the character 60 and the treasure position Pt on the whole map M1.

As above, the direction signal includes the effect sound command C1 specifying the sound image position Ps determined in accordance with the traveling direction AR of the character 60 and the relation between the current position Pc of the character 60 and the treasure position Pt, and the mobile device 20 output the direction signal. This allows a user easily to know which direction the treasure position Pt is in based on the current position Pc of the character 60, and whether the current position Pc of the character 60 is getting closer to the treasure position Pt. This provides greater entertainment compared to the case of the sound output from the mobile device 20. Besides, since the sound image position Ps moves in accordance with the traveling direction of the character 60 on the whole map M1, a user can easily perceive which direction the treasure position is in based on the traveling direction of the character 60.

The vehicle velocity may be taken into account based on a user setting. In an example, the controller 23 changes the effect sound or others specified by the effect sound command C1 in accordance with the vehicle velocity. This can provide much greater entertainment.

When the current position Pc of the character 60 moves to the position almost identical with the treasure position Pt, it is judged that the treasure was found. In this case, the controller 23 transmits to the in-vehicle apparatus 10 the direction signal including the effect sound command C1 for celebrating a treasure discovery at the timing when two positions of the current position Pc and the treasure position Pt are almost identical. The output part 14e reads out from the memory 13 the effect sound data 16 indicating the effect sound for celebrating the treasure discovery based on the effect sound command C1 received by the receiver 14d, and outputs the effect sound via the in-vehicle speakers 31.

The controller 23 of the mobile device 20 terminates the treasure hunting game when the treasure is discovered or when a user makes a predetermined operation. The controller 23 outputs to the in-vehicle apparatus 10 the direction signal including the BGM stop command C3 at the timing when the treasure hunting game is terminated as above. When the receiver 14d receives the direction signal including the BGM stop command C3, the output part 14e terminates the output of the BGM from the in-vehicle speakers 31 based on the BGM stop command C3.

As above, the output part 14e can output the effect sound from the in-vehicle speakers 31 in accordance with the effect sound command C1. This can shorten the delays attributable to the data communication compared to the case where the effect sound is output from the mobile device 20, which leads to providing greater entertainment of the treasure hunting game. The output part 14e controls the sound image position and the sound volume in accordance with the effect sound command C1, and also can select an effect sound type. This provides much greater entertainment of the treasure hunting game.

The output part 14e starts the output of the BGM based on the direction signal output from the mobile device 20 when starting execution of the application 26 of the treasure hunting game. The output part 14e also terminates the output of the BGM based on the direction signal output from the mobile device 20 when terminating execution of the application 26 of the treasure hunting game.

As above, the mobile device 20 gives only the directions of starting and terminating the output of the BGM, which drastically reduces the communication volume compared to the case where the mobile device 20 keeps outputting the BGM data indicating BGM. In the result, this drastically shortens the delays of the output of the effect sound for overlapping with the BGM or interrupting the BGM.

In the above description, the mobile device 20 judges the traveling direction of the character 60 and the relation between the current position Pc of the character 60 and the treasure position Pt, and transmits to the in-vehicle apparatus 10 the direction signal including the effect sound command C1. However, the in-vehicle apparatus 10 may judge the traveling direction of the character 60 and the relation between the current position Pc of the character 60 and the treasure position Pt, and may output an appropriate effect sound from the in-vehicle speakers 31.

In this case, the map acquisition part 14b, in an example, obtains the position data from the vehicle-data acquisition part 14a, determines a certain position in a predetermined range from the current position based on the position data as the treasure position at random or based on a predetermined rule, and stores the determined treasure position inside.

Then, the map acquisition part 14b creates the effect sound command C1 according to the relation between the position of the character 60 and the treasure position stored inside, and transmits the effect sound command C1 to the output part 14e.

As above, the creation of the effect sound command C1 by the side of the in-vehicle apparatus 10 omits the communication between the in-vehicle apparatus 10 and the mobile device 20 for the output of the effect sound, which prevents the occurrence of output delay of the effect sound.

Figure 7:
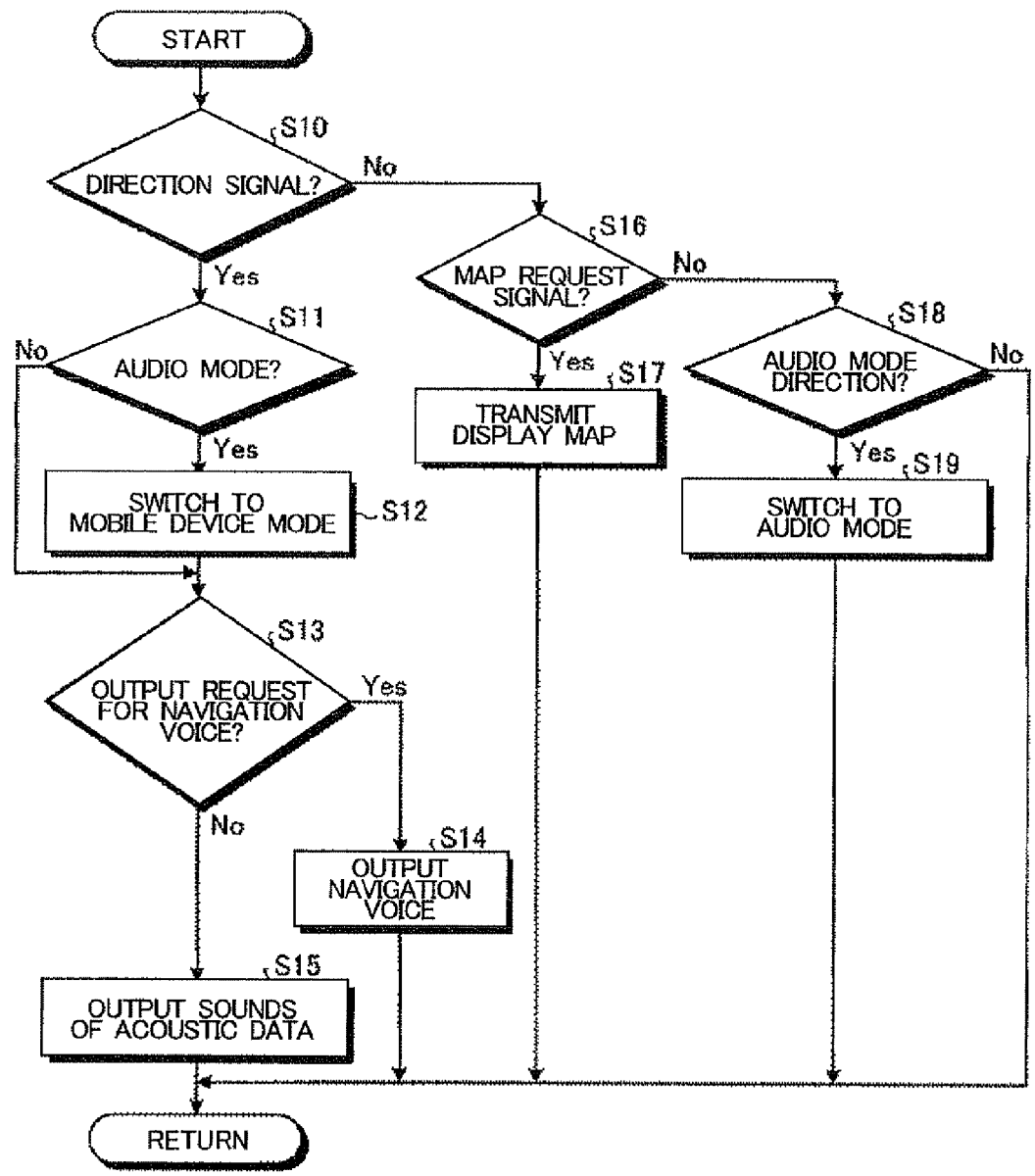
FIG. 7 is a flowchart showing major procedures that a controller of the in-vehicle apparatus executes.

Next, concrete operations of the in-vehicle apparatus 10 of the embodiment will be described in reference to FIG. 7. FIG. 7 is a flowchart showing the major procedures executed by the controller 14 of the in-vehicle apparatus 10. The procedures shown in FIG. 7 are executed repeatedly.

As shown in FIG. 7, the in-vehicle apparatus 10 judges whether the receiver 14d has received the direction signal from the mobile device 20 (step S10). When the receiver 14d has received the direction signal (Yes at the step S10), the output part 14e judges whether the current operation mode is an audio mode (step S11).

The in-vehicle apparatus 10 provides an audio mode and a mobile device mode as operation modes. The audio mode is for activating an audio function included in the in-vehicle apparatus 10. The mobile device mode is for linking up with the mobile device 20. In the audio mode, the audio function is activated, and sounds from a radio or a music disc are output from the in-vehicle speakers 31.

At the step S11, in the case where the current operation mode is the audio mode (Yes at the step S11), the output part 14e switches the operation mode to the mobile device mode (step S12), and a procedure moves on to a step S13. In the case where the current operation mode is not the audio mode (No at the step S11), the procedure moves on to the step S13 without switching.

Next, the output part 14e judges whether an output request for navigation voice has been received (step S13). At the step S13, when the output request for the navigation voice has been received (Yes at the step S13), the output part 14e outputs the navigation voice (step S14). When the output request for the navigation voice has not been received (No at the step S13), the procedure moves on to the step S15 where sounds are output in accordance with a direction from the mobile device 20.

As above, when the output request for the navigation voice has been received, the output part 14e outputs the navigation voice preferentially. In this case, the navigation voice is output at a normal sound image position regardless of the sound image position Ps specified by the control command. This surely helps a driver in safety driving.

At the step S15, the output part 14e outputs via the in-vehicle speakers 31 sounds based on the acoustic data according to the direction signal from the mobile device 20. In the case where the BGM start command C2 is included in the direction signal from the mobile device 20, the output part 14e reads out the BGM data from the memory 13 according to the BGM start command C2 and starts to output the BGM.

In the case where the effect sound command C1 is included in the direction signal from the mobile device 20, the output part 14e reads out the effect sound data from the memory 13 according to the effect sound command C1 and outputs the effect sound. In the case where the BGM stop command C3 is included in the direction signal from the mobile device 20, the output part 14e terminates the output of the BGM.

At the step S10, when the direction signal has not been received (No at the step S10), the receiver 14d judges whether the map request signal from the mobile device 20 has been received (step S16). When the map request signal has been received (Yes at the step S16), the map acquisition part 14b reads out from the memory 13 the map image of the position corresponding to the request from the mobile device 20.

Then, the map acquisition part 14b creates the display map M2 based on the read-out map image, and transmits the display map M2 via the transmitter 14c to the mobile device 20 (step S17).

At the step S16, when the map request signal has not been received (No at the step S16), the output part 14e judges whether a user direction for switching the operation mode of the in-vehicle apparatus 10 to the audio mode has been received (step S18). When the user direction for switching to the audio mode has been received (Yes at the step S18), the output part 14e switches the operation mode from the mobile device mode to the audio mode (step S19).

When each of the procedures at the step S14, step S15, step S17 and step S19 is completed, or when the direction for switching to the audio mode has not been received at the step S18 (No at the step S18), the procedure returns to the step S10.

As described so far, in the in-vehicle apparatus 10 of the embodiment, the memory 13 stores in advance the acoustic data 13b relevant to the application 26 executed on the mobile device 20. In response to the direction signal transmitted from the mobile device 20 at the timing specified by the application 26, the output part 14e outputs sounds based on the acoustic data 13b stored in the memory 13.

This shortens the delays attributable to the data communication compared to the case of transmitting the acoustic data from the mobile device 20 to the in-vehicle apparatus 10, which provides greater entertainment.

An in-vehicle apparatus of the invention functions effectively when outputting sounds from in-vehicle speakers by linking up with a mobile device, and is suitable especially for the technology for providing greater entertainment in the case of execution of an application on a mobile device.

While the invention has been shown and described in detail, the foregoing description is in all aspects illustrative and not restrictive. It is therefore understood that numerous other modifications and variations can be devised without departing from the scope of the invention.

What is claimed is:

1. An in-vehicle apparatus that is used in a vehicle, the in-vehicle apparatus comprising:
    a memory that stores acoustic data relevant to an application executed on a mobile device linking up with the in-vehicle apparatus;
    a receiver that receives a direction signal transmitted from the mobile device at a timing specified by the application; and
    an output part that outputs a sound based on the acoustic data stored in the memory, via a speaker in response to the direction signal received by the receiver.

2. The in-vehicle apparatus of claim 1, wherein the speaker is set up in the vehicle.

3. The in-vehicle apparatus of claim 1, wherein the direction signal is transmitted from the mobile device when a predetermined event occurs during execution of the application.

4. The in-vehicle apparatus of claim 1, wherein the direction signal is transmitted from the mobile device when a user operates the mobile device during execution of the application.

5. The in-vehicle apparatus of claim 1, wherein the memory stores a plurality of the acoustic data, the direction signal includes specification data for specifying one of the plurality of acoustic data, and the output part outputs the sound based on the acoustic data specified by the specification data.

6. The in-vehicle apparatus of claim 1, wherein the direction signal includes specification data for specifying a sound image position where a sound image is localized, and the output part outputs the sound based on the acoustic data in accordance with the specification data via a plurality of the speakers to localize the sound image at the sound image position.

7. The in-vehicle apparatus of claim 1, wherein the acoustic data includes BGM (background music) data of a BGM, and the output part starts output of the BGM based on the direction signal transmitted from the mobile device when execution of the application starts on the mobile device, and the output part terminates the output of the BGM based on the direction signal transmitted from the mobile device when the execution of the application terminates on the mobile device.

8. The in-vehicle apparatus of claim 1, wherein the acoustic data includes effect sound data of an effect sound, and the output part outputs the effect sound in accordance with the direction signal transmitted from the mobile device when a predetermined event occurs during execution of the application.

9. A sound output method for outputting a sound in an in-vehicle apparatus used in a vehicle, the sound output method comprising the steps of:
    (a) receiving a direction signal transmitted from a mobile device at a timing specified by an application executed on the mobile device linking up with the in-vehicle apparatus; and
    (b) outputting the sound based on acoustic data stored in a memory of the in-vehicle apparatus, via a speaker in response to the direction signal received in the step (a), the memory storing the acoustic data relevant to the application.

10. The sound output method of claim 9, wherein the speaker is set up in the vehicle.

11. The sound output method of claim 9, wherein the direction signal is transmitted from the mobile device when a predetermined event occurs during execution of the application.

12. The sound output method of claim 9, wherein the direction signal is transmitted from the mobile device when a user operates the mobile device during execution of the application.

13. The sound output method of claim 9, wherein the memory stores a plurality of the acoustic data, the direction signal includes specification data for specifying one of the plurality of acoustic data, and the step (b) outputs the sound based on the acoustic data specified by the specification data.

14. The sound output method of claim 9, wherein the direction signal includes specification data for specifying a sound image position where a sound image is localized, and the step (b) outputs the sound based on the acoustic data in accordance with the specification data via a plurality of the speakers to localize the sound image at the sound image position.

15. A non-transitory computer-readable recording medium that stores a program executable by a computer included in an in-vehicle apparatus used in a vehicle, the program allowing the computer to execute the steps of
    (a) receiving a direction signal transmitted from a mobile device at a timing specified by an application executed on the mobile device linking up with the in-vehicle apparatus; and
    (b) outputting a sound based on acoustic data stored in a memory of the in-vehicle apparatus, via a speaker in response to the direction signal received in the step (a), the memory storing the acoustic data relevant to the application.

16. The recording medium of claim 15, wherein the speaker is set up in the vehicle.

17. The recording medium of claim 15, wherein the direction signal is transmitted from the mobile device when a predetermined event occurs during execution of the application.

18. The recording medium of claim 15, wherein the direction signal is transmitted from the mobile device when a user operates the mobile device during execution of the application.

19. The recording medium of claim 15, wherein the memory stores a plurality of the acoustic data, the direction signal includes specification data for specifying one of the plurality of acoustic data, and the step (b) outputs the sound based on the acoustic data specified by the specification data.

20. The recording medium of claim 15, wherein
the direction signal includes specification data for specifying a sound image position where a sound image is localized, and
the step (b) outputs the sound based on the acoustic data in accordance with the specification data via a plurality of the speakers to localize the sound image at the sound image position.

* * * * *